(12) United States Patent
Costanzo et al.

(10) Patent No.: US 7,344,018 B2
(45) Date of Patent: *Mar. 18, 2008

(54) CONVEYOR AND METHOD FOR DIVERTING CLOSELY SPACED ARTICLES

(75) Inventors: Mark Costanzo, River Ridge, LA (US); Eric M. Pressler, New Orleans, LA (US); Matthew L. Fourney, Savage, MD (US)

(73) Assignee: Laitram, L.L.C., Harahan, LA (US)

( * ) Notice: Subject to any disclaimer, the term of this patent is extended or adjusted under 35 U.S.C. 154(b) by 27 days.

This patent is subject to a terminal disclaimer.

(21) Appl. No.: 10/908,933

(22) Filed: Jun. 1, 2005

(65) Prior Publication Data

US 2006/0249355 A1    Nov. 9, 2006

Related U.S. Application Data

(63) Continuation-in-part of application No. 10/908,326, filed on May 6, 2005.

(51) Int. Cl.
*B65G 17/24* (2006.01)

(52) U.S. Cl. .................. 198/779; 198/370.09

(58) Field of Classification Search ........ 198/779, 198/370.09, 371.3
See application file for complete search history.

(56) References Cited

U.S. PATENT DOCUMENTS

| | | | |
|---|---|---|---|
| 2,566,417 A | 9/1951 | Holm | 198/31 |
| 3,550,756 A | 12/1970 | Kornylak | |
| 3,973,672 A | 8/1976 | Frost | 198/283 |
| 4,039,074 A | 8/1977 | Maxted | 198/456 |
| 4,264,002 A | 4/1981 | Van Der Schie | 198/365 |
| 5,092,447 A | 3/1992 | Wyman | 198/374 |
| 5,101,958 A | 4/1992 | LeMay et al. | 198/436 |
| 5,145,049 A * | 9/1992 | McClurkin | 198/374 |
| 5,400,896 A | 3/1995 | Loomer | 198/415 |
| 5,551,543 A | 9/1996 | Mattingly et al. | 198/370.09 |
| 5,769,204 A | 6/1998 | Okada et al. | 198/443 |
| 5,988,351 A * | 11/1999 | Warkentin | 198/370.04 |
| 6,073,747 A | 6/2000 | Takino et al. | 198/370.09 |

(Continued)

FOREIGN PATENT DOCUMENTS

JP    03-088617 A    4/1991

*Primary Examiner*—Joe Dillon, Jr.
(74) *Attorney, Agent, or Firm*—James T. Cronvich

(57) ABSTRACT

A conveyor and associated method for diverting closely spaced articles conveyed along the conveyor. The conveyor includes a conveyor belt with belt rollers oriented to rotate on axes oblique to the direction of belt travel. A series of arrays of bearing surface elements are arranged end to end along the length of the conveyor. The bearing surfaces may be static or rotational. Each array defines a roller-control zone in which the array is selectively activated with its bearing surface elements in contract with the belt rollers or deactivated with its bearing surface elements out of contact with the belt rollers. As the belt advances through an activated roller-control zone, the belt rollers rotate to propel a conveyed article toward a side of the belt. The contiguous roller-control zones are sequentially activated and deactivated to direct articles to the side and off the belt or to let them pass straight through. The length of the entire series of roller-control zones determines the lateral extent of the sidewise diversion. The length of each roller-control zone determines the minimum gap between consecutively conveyed articles. The serial cascade of these roller-control zones permits the tight sortation of closely spaced articles for high throughput.

26 Claims, 10 Drawing Sheets

U.S. PATENT DOCUMENTS

| | | |
|---|---|---|
| 6,318,544 B1 | 11/2001 | OConnor et al. ............ 198/853 |
| 6,343,685 B1 * | 2/2002 | Hofer .................... 198/370.09 |
| 6,401,936 B1 | 6/2002 | Isaacs et al. ................ 209/656 |
| 6,494,312 B2 | 12/2002 | Costanzo .................... 198/779 |
| 6,571,937 B1 | 6/2003 | Costanzo et al. ........... 198/779 |
| 6,648,125 B1 | 11/2003 | Bershadsky .............. 198/460.1 |
| 6,681,922 B2 | 1/2004 | Corley et al. ............... 198/853 |
| 6,758,323 B2 | 7/2004 | Costanzo .............. 198/457.02 |
| 6,923,309 B2 | 8/2005 | Costanzo .................... 198/411 |
| 6,968,941 B2 * | 11/2005 | Fourney .................... 198/779 |
| 7,007,792 B1 * | 3/2006 | Burch .................. 198/457.02 |
| 7,111,722 B2 * | 9/2006 | Burch ........................ 198/411 |
| 7,249,669 B2 * | 7/2007 | Fourney ............... 198/370.09 |
| 2002/0108839 A1 | 8/2002 | Baker et al. ........... 198/781.03 |
| 2005/0023105 A1 | 2/2005 | Costanzo et al. ...... 198/35 MD |
| 2005/0109582 A1 | 5/2005 | Fourney .................... 198/779 |

\* cited by examiner ns that extend past the outer and inner surfaces of the conveyor belt. The belt rollers are arranged to rotate on axes oblique to the direction of belt travel. A series of bearing surface elements are arranged end to end in the direction of belt travel along the carryway. The bearing surface elements are individually movable into and out of contact with the salient portions of the belt rollers that extend past the inner side of the conveyor belt.

CONVEYOR AND METHOD FOR DIVERTING CLOSELY SPACED ARTICLES

CROSS-REFERENCE

This application is a continuation-in-part of co-pending U.S. application Ser. No. 10/908,326, filed May 6, 2005, entitled "Roller-Belt Conveyor for Accumulating and Moving Articles Laterally across the Conveyor," which is incorporated by reference.

BACKGROUND

The invention relates generally to power-driven conveyors and, more particularly, to conveyors having conveyor belts with article-supporting rollers that rotate on axes oblique to the direction of belt travel when engaged by bearing surfaces sequentially activated into contact with the rollers in contiguous zones along the conveyor.

Modular plastic conveyor belts with article-supporting rollers extending past outer and inner belt surfaces are used in many conveying applications. When the rollers are arranged to rotate on axes oblique to the direction of belt travel and are contacted by bearing surfaces at the inner belt surface, the rollers can propel conveyed articles toward a side of the belt as it advances. The bearing surfaces in a region of the conveyor may be raised into an activated position in contact with the rollers from a lowered, deactivated position out of contact with the rollers. The bearing surfaces are conventionally flat wear surfaces or cylindrical outer surfaces of rollers that are free to rotate on axes in the direction of belt travel. Sometimes it is required that consecutive conveyed articles be directed to different locations. For example, a leading article may have to be diverted off the side of the belt to another conveyor while a trailing article may have to continue undiverted along the conveyor. If the bearing surfaces activate the rollers when the leading article is riding atop them, the article will be directed off the side of the belt, after which the bearing surfaces are lowered to deactivate the rollers to allow the trailing article to ride with the belt without being diverted. The length of the bearing surface section raised and lowered defines the minimum spacing between consecutive articles because no two articles should be on the belt in an activated region at the same time.

This conveying scheme is effective in many applications, such as article sorting. But moving an article across the width of a wide belt requires an extended-length activated region and, consequently, a greater spacing between consecutive conveyed articles. The increased spacing reduces conveyor throughput.

Thus, there is a need for a conveyor that can rapidly divert closely spaced articles for sorting and other conveying applications.

SUMMARY

This need and other needs are satisfied by a conveyor embodying features of the invention. In one aspect of the invention, a conveyor comprises a conveyor carryway extending from an upstream end to a downstream end. A conveyor belt is supported in the carryway and advances in a direction of belt travel from the upstream end to the downstream end of the carryway. The conveyor belt extends laterally from a first side edge to a second side edge and in thickness from an outer surface to an inner surface. The conveyor belt further includes belt rollers with salient portions that extend past the outer and inner surfaces of the conveyor belt. The belt rollers are arranged to rotate on axes oblique to the direction of belt travel. A series of bearing surface elements are arranged end to end in the direction of belt travel along the carryway. The bearing surface elements are individually movable into and out of contact with the salient portions of the belt rollers that extend past the inner side of the conveyor belt.

In another aspect of the invention, a conveyor system comprises a conveyor that extends from an upstream end to a downstream end and laterally from a first side to a second side. A conveyor belt supported in the conveyor advances in a direction of belt travel from the upstream end to the downstream end of the conveyor. The belt has belt rollers arranged to rotate on axes oblique to the direction of belt travel. The belt rollers extend through a conveying side of the belt atop which articles are conveyed and an opposite side. A series of contiguous roller-control zones are formed end to end along the conveyor in the direction of belt travel. Each roller-control zone includes at least one bearing surface disposed at the opposite side of the conveyor belt. An actuator coupled to the bearing surface moves the bearing surface into a first position and a second position. In the first position, the bearing surface contacts the belt rollers in the roller-control zone to activate the roller-control zone by causing the belt rollers to rotate as the belt advances. The rotation of the belt rollers diverts conveyed articles in the activated roller-control zone toward the first side of the conveyor. In the second position, the bearing surface is out of contact with the belt rollers in the roller-control zone to deactivate the roller-control zone, which allows articles to continue to be conveyed in the direction of belt travel.

Another aspect of the invention provides a method for use with a conveyor that comprises a conveyor belt advancing in a direction of belt travel and having a plurality of belt rollers that are arranged to rotate on axes oblique to the direction of belt travel and that extend past a conveying surface of the belt to support conveyed articles and past an opposite surface of the belt into rolling contact with bearing surfaces. The method, which is for selectively diverting closely spaced articles conveyed on the belt, comprises: (1) arranging the bearing surfaces into individual groups disposed end to end in the direction of belt travel to define associated roller-control zones contiguously disposed along the conveyor; and (2) selectively activating each roller-control zone by moving the associated group of bearing surfaces into contact with belt rollers in the conveyor belt and selectively deactivating each roller-control zone by moving the associated group of bearing surfaces out of contact with belt rollers in the conveyor belt.

In yet another aspect of the invention for use with a similar conveyor, a method for diverting articles conveyed on the belt comprises: (1) forming a series of contiguous roller-control zones along the conveyor in the direction of belt travel, wherein each roller-control zone has at least one bearing surface selectively movable between a first position in contact with the belt rollers in the roller-control zone to activate the roller-control zone and a second position out of contact with the belt rollers in the roller-control zone to deactivate the roller-control zone; (2) activating a first roller-control zone as a conveyed article enters the first roller-control zone; (3) activating a contiguous second roller-control zone as the conveyed article enters the second roller-control zone from the first roller-control zone; and (4) deactivating the first roller-control zone after the conveyed article exits the first roller-control zone.

BRIEF DESCRIPTION OF THE DRAWINGS

These features and aspects of the invention, as well as its advantages, are better understood by reference to the following description, appended claims, and accompanying drawings, in which:

FIGS. 5A and 5B through FIGS. 9A and 9B are top plan and side elevation diagrams showing the operation of a conveyor as in FIGS. 1A and 1B step by step;

DETAILED DESCRIPTION

Figure 1A:
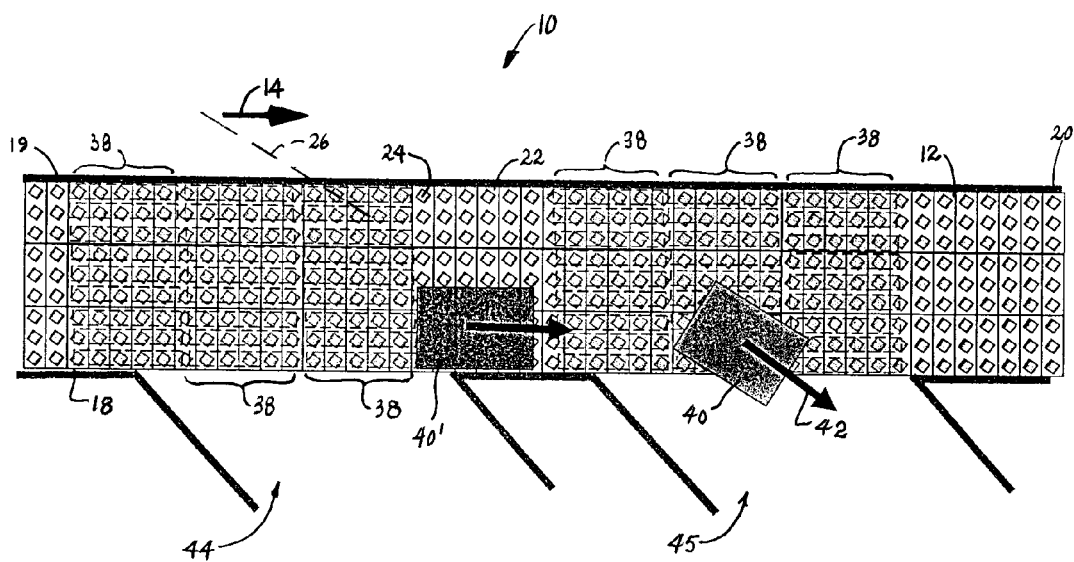
FIGS. 1A and 1B are top plan and side elevation diagrams of a conveyor embodying features of the invention.
Figure 1B:
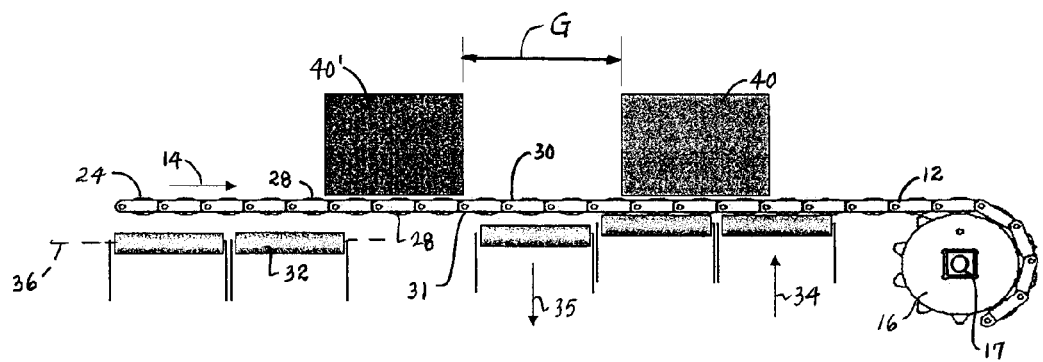

One version of a conveyor embodying features of the invention is illustrated in FIGS. 1A and 1B. The conveyor 10 provides a conveying surface in the form of a modular conveyor belt 12 driven in a direction of belt travel 14 by a drive sprocket set 16 mounted on a motor-driven shaft 17. The belt, which extends laterally in width from a first side edge 18 to a second side edge 19, is trained around the drive sprocket set at a downstream end 20 of a carryway 22 and an idler sprocket set (not shown) at an upstream end of the carryway. The belt, which is an endless loop, returns from the downstream end to the upstream end along a returnway (not shown) beneath the carryway.

The belt is characterized by a plurality of belt rollers 24 that rotate on axes 26 oblique to the direction of belt travel 14. Salient portions 28 of the belt rollers protrude past outer and inner surfaces 30, 31 of the belt. Rollers 32 underlying the carryway portion of the belt are selectively raised 34 into and lowered 35 out of contact with the salient portions of belt rollers extending past the inner surface of the belt. Each roller 32 is a longitudinal roller that is freely rotatable on an axis 36 in the direction of belt travel. The rollers are arranged in arrays of longitudinal rollers laterally spaced apart to underlie longitudinal lanes of belt rollers. Each array of longitudinal rollers defines a roller-control zone 38 along the length of the conveyor. Actuators, such as pneumatic, hydraulic, or electric actuators, raise and lower each array. When an array is raised, as, for example, the two most downstream roller arrays in FIG. 1B, rolling friction between the longitudinal rollers in contact with belt rollers causes both to rotate. The oblique orientation of the belt rollers causes articles 40 atop the belt rollers in an activated zone to be forced forward and laterally as indicated by arrow 42. Articles 40' in a deactivated zone or in a portion of the conveyor carryway devoid of longitudinal rollers advance in the direction of belt travel because the belt rollers are not forced to rotate. To improve the frictional engagement of the belt rollers by the longitudinal rollers, the belt rollers preferably have a rubber or elastomeric sleeve around their peripheries, and the longitudinal rollers are preferably urethane-coated.

The conveyor system in the example of FIGS. 1A and 1B is shown with two takeaway conveyors 44, 45 extending obliquely from the first side edge of the main conveyor 10, such as in a sorting application. The arrays of longitudinal rollers are shown in groups of three arrays arranged end to end just upstream of and along the mouth of each takeaway conveyor. Each array is independently and selectively activated or deactivated to divert or pass a conveyed article as it is conveyed through the associated zone. The length of each array or roller-control zone in the direction of belt travel determines the minimum length of the gap G separating consecutive conveyed articles. In general, shorter roller-control zones mean closer article spacing. But, to divert an article riding along the left side of the conveyor belt off the right side requires a certain length of activated rollers. Cascading a series of sequentially activated longitudinal roller arrays end to end provides the extended contact distance necessary to divert an article off or toward the side of the belt while allowing the close spacing of consecutive articles.

Figure 2:
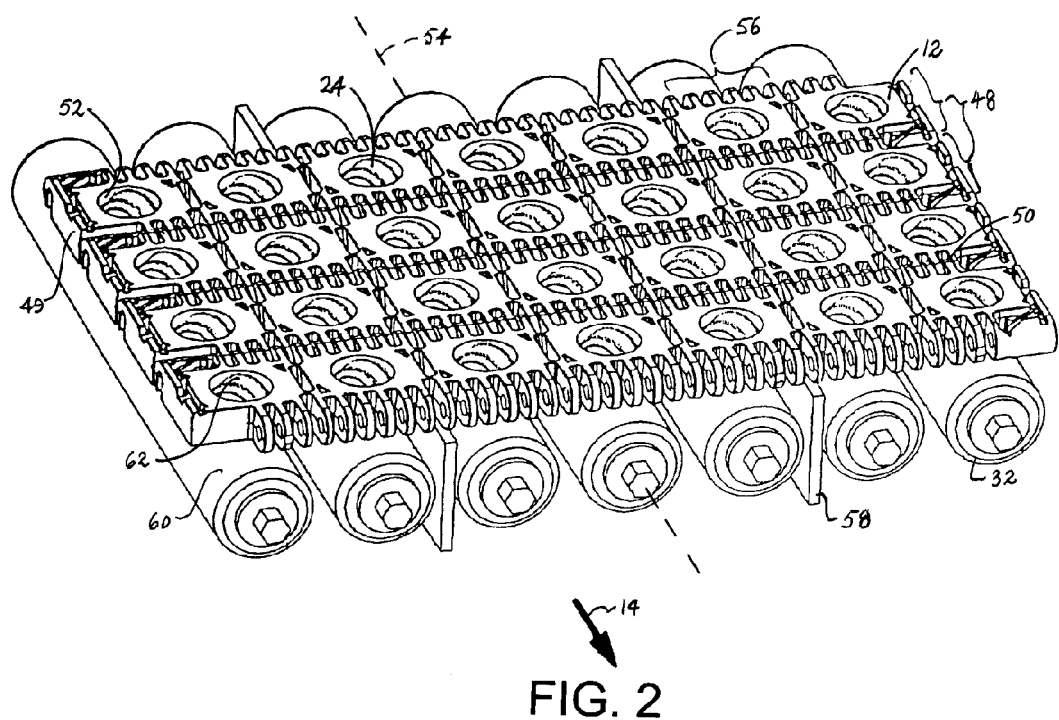
FIG. 2 is an isometric view of a portion of a conveyor as in FIGS. 1A and 1B, showing a single roller-control zone.

A simple roller-control zone is shown in FIG. 2. The belt 12 is a modular plastic conveyor belt constructed of individual rows 48 of one or more belt modules 49 connected together end to end by hinge rods at hinge joints 50. Cavities 52 in the belt admit belt rollers 24 that rotate on axes oblique to the direction of belt travel 14. One modular plastic belt having these features is the Series 400 Angled Roller™ belt manufactured and sold by Intralox, L.L.C. of Harahan, La., USA. The belt modules are made of a thermoplastic polymer, such as polypropylene, polyethylene, acetal, and composite materials, by injection molding. The longitudinal rollers 32 are arranged side by side with each roller rotatable about a longitudinal axis 54 in the direction of belt travel. Each longitudinal roller underlies a longitudinal lane 56 of belt rollers. The belt is supported along the carryway on narrow rails 58 between adjacent longitudinal lanes of rollers. The longitudinal rollers are mounted in a common frame (not shown) that includes roller bearings at each end of the rollers. The frame is activated to raise and lower all the longitudinal rollers together into and out of contact with the belt rollers. When the roller-control zone is activated with the roller array in a raised position, the belt rollers coact with the longitudinal rollers in rolling contact with little or no slip as the belt advances in the direction of belt travel. The engagement between the rollers is improved by the urethane cylindrical bearing surface 60 of the longitudinal rollers and the rubber or elastomeric sleeve 62 around the periphery of the belt rollers.

Figure 3:
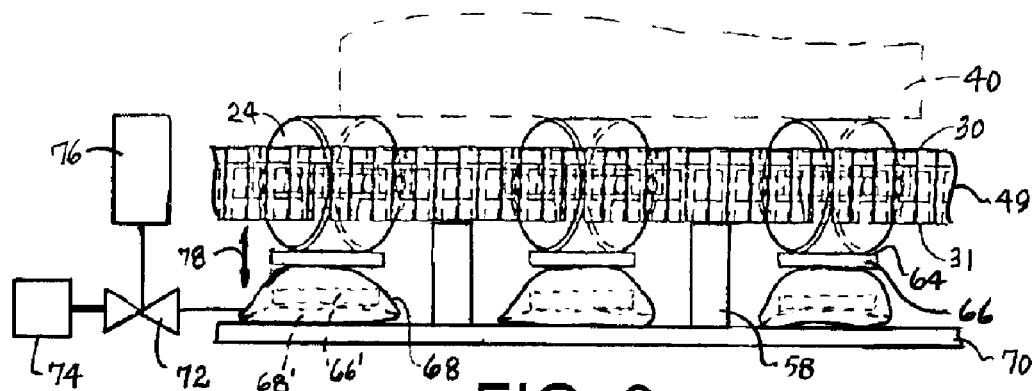
FIG. 3 is a front elevation view of a portion of another version of conveyor as in FIGS. 1A and 1B featuring a wearstrip bearing surface.
Figure 4:
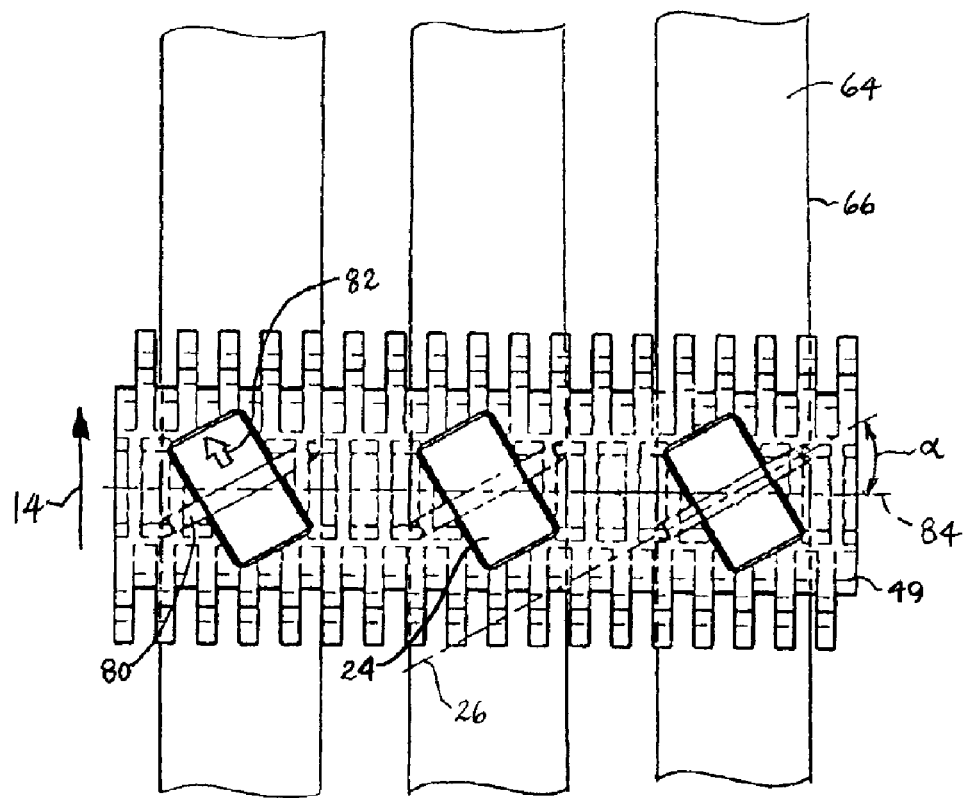
FIG. 4 is a top plan view of the conveyor of FIG. 3.
Figure 5A:
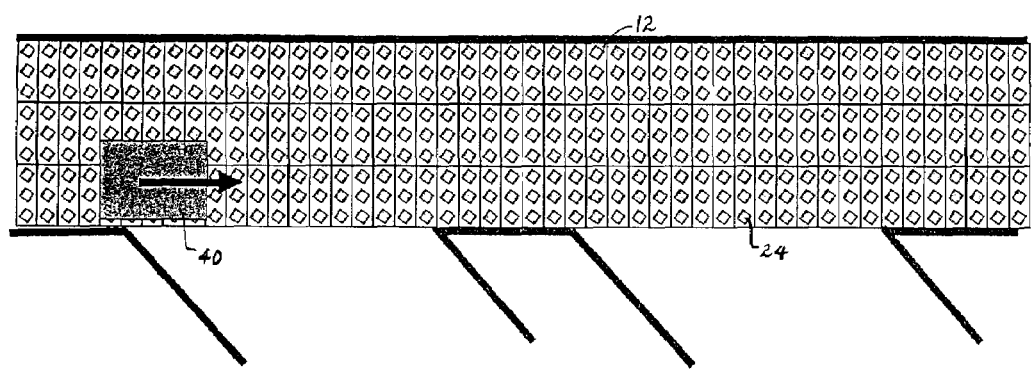
Figure 5B:
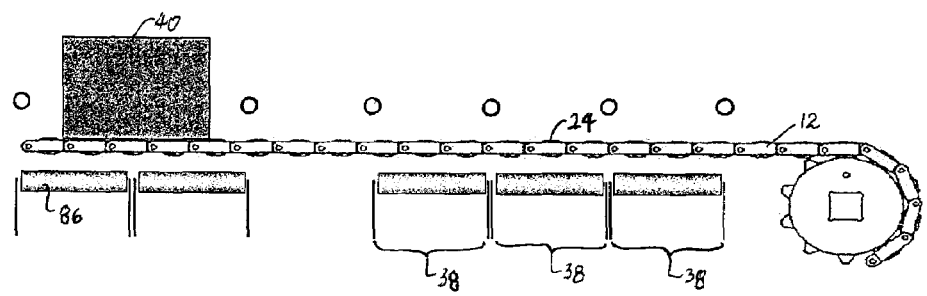

Another version of bearing surface is shown in FIGS. 3 and 4. Instead of on rollers, the bearing surface 64 is formed on wearstrips 66 extending in the direction of belt travel 14 under longitudinal lanes of belt rollers. The wearstrips are supported atop bladders 68 mounted on a carryway bed 70. The belt, itself, is supported on rails 58 positioned between longitudinal lanes of belt rollers. The bladders, which act as actuators for the bearing surfaces, are pneumatically operated by a control valve 72 that is supplied compressed air by a compressor 74. The valve is controlled by a controller 76, such as a programmable logic controller or other intelligent device. Air is injected into the bladders to raise the wearstrips and released to lower them as indicated by arrow 78. In a raised position, the flat bearing surface 64 of the wearstrips contacts the salient portion of the rollers 24 extending past the inner surface 31 of the belt. This contact causes the belt rollers to rotate. The salient portion of the oblique belt rollers protruding past the outer surface 30 of the belt propels conveyed articles 40 toward a side of the belt. In a lowered position, the lowered wearstrip 66' rests atop deflated bladder 68' out of contact with the belt rollers.

As also shown in FIG. 4, the belt rollers 24 rotate on axes 26 oblique to the direction of belt travel 14. Bores through the rollers admit an axle 80 supported at its ends within the belt module. The axle, of course, defines the axis of rotation of the roller and causes the belt roller in contact with an underlying bearing surface 64 to rotate in the direction of arrow 82 as the belt advances. The angle α of the roller is the angle between its axis of rotation and a lateral axis 84 perpendicular to the direction of belt travel. Roller angles of about 30° or less work well with flat wearstrip. For greater angles, such as 45° and 60°, longitudinal rollers are required as bearing surface elements to reduce slip and the consequent sliding friction between belt roller and bearing surface.

The operation of the conveyor is shown step by step in FIGS. 5A and 5B through FIGS. 9A and 9B. A leading article 40 is shown atop the conveyor in FIGS. 5A and 5B. All the bearing surface elements 86, whether roller or wearstrip, in all the roller-control zones are deactivated (indicated as a lowered position). This allows the article 40 atop the non-rotating belt rollers 24 to advance along the conveyor in the direction of belt travel with the belt 12. Sensors 88, such as optical sensors or proximity switches, may be used to sense a conveyed article's entry into or exit from a roller-control zone 38. Sensor signals indicating the location of conveyed articles along the roller-control zones are sent to the controller to control the zones.

Figure 6A:
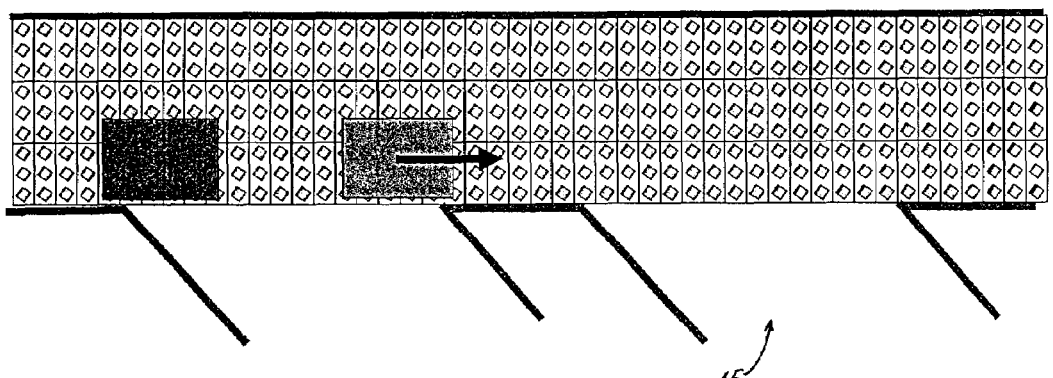
Figure 6B:
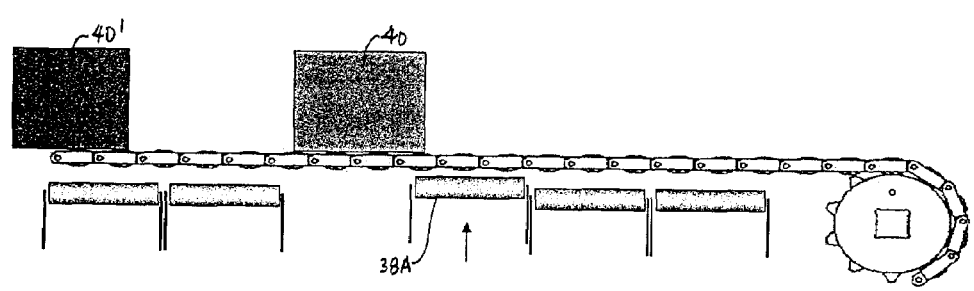

In FIGS. 6A and 6B, a trailing article 40' follows the leading article 40 in an upstream portion of the conveyor carryway. Because the leading article is to be sorted off the side of the conveyor to the downstream takeaway conveyor 45, the first downstream roller-control zone 38A is activated as soon as the leading article enters. With the oblique belt rollers in rolling contact with the raised bearing surface in the zone, the leading article is directed toward the side of the belt. In the meantime, the roller-control zones underlying the trailing article are deactivated (lowered), and the trailing article rides along with the belt.

Figure 7A:
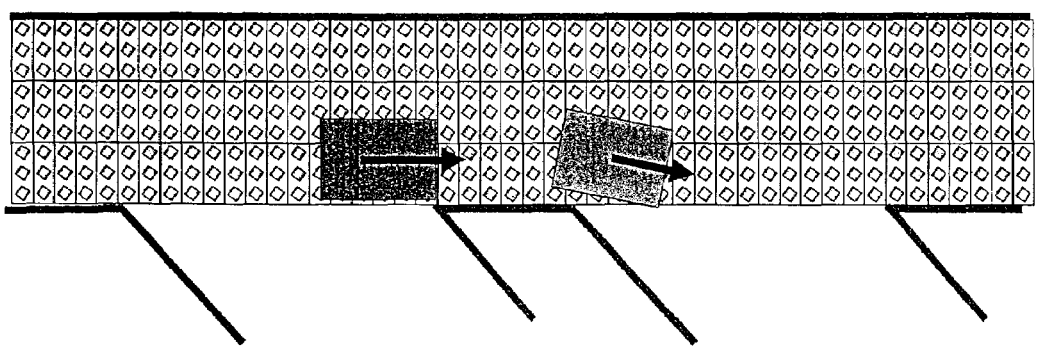
Figure 7B:
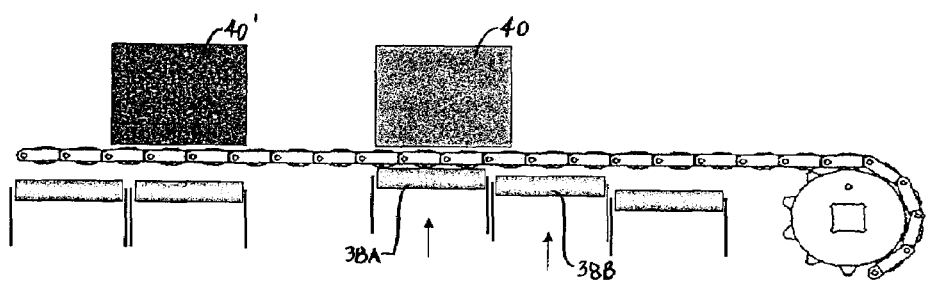

As the leading article makes its turn toward the downstream takeaway conveyor in FIGS. 7A and 7B, it enters the second downstream roller-control zone 38B, which is then activated. The leading article, which straddles both activated zones, is propelled toward the takeaway conveyor. In the meantime, the trailing article continues to ride along with the belt through deactivated roller-control zones.

Figure 8A:
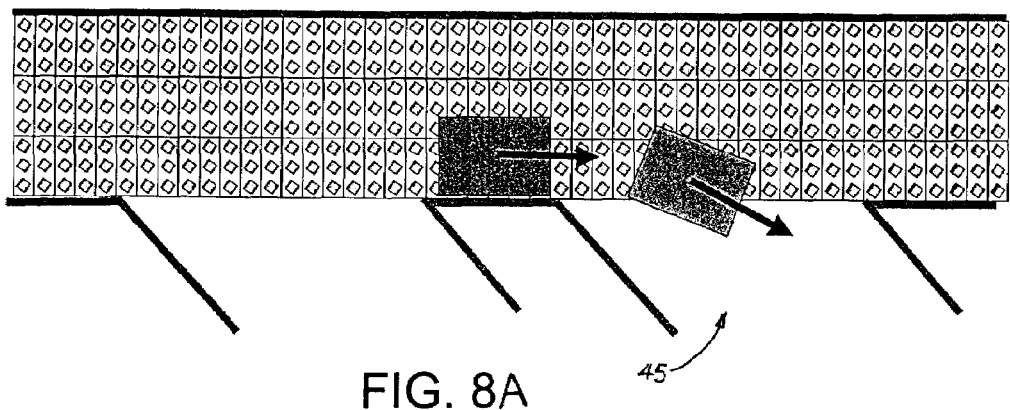
Figure 8B:
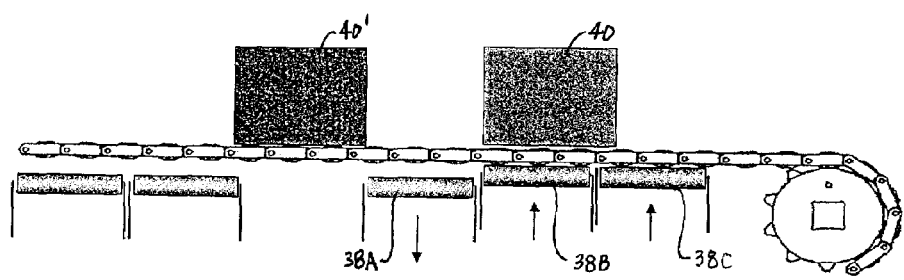

As soon as the leading article 40 exits the first downstream control zone 38A, the bearing surface elements are lowered to deactivate the zone in anticipation of the trailing article 40', as shown in FIGS. 8A and 8B. In the meantime, the third downstream roller-control zone 38C is activated to continue pushing, along with roller-control zone 38B, the leading article toward the side edge of the belt onto the downstream takeaway conveyor 45.

Figure 9A:
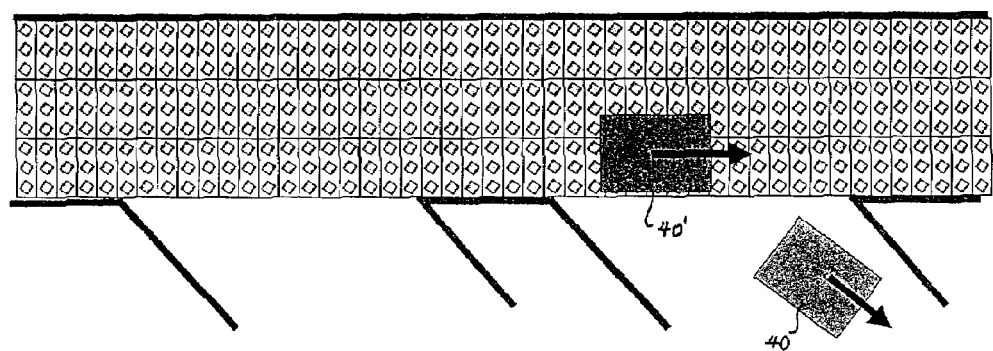
Figure 9B:
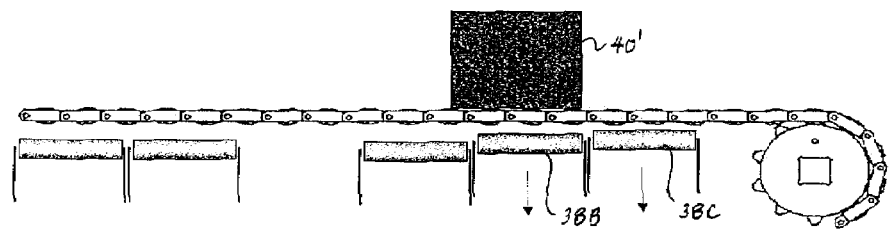

As shown in FIGS. 9A and 9B, once the leading article 40 clears the second 38B and the third 38C roller-control zones, they are individually deactivated (lowered). This allows the trailing article 40' to pass through the roller-control zones without being diverted off the conveyor belt.

Figure 10:
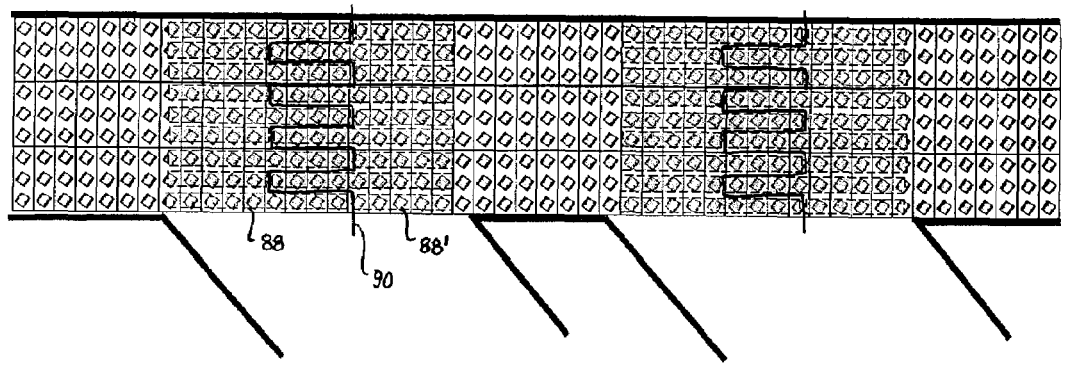
FIG. 10 is a top plan diagram of another version of a conveyor embodying features of the invention including bricklaid roller-control zones.
Figure 11:
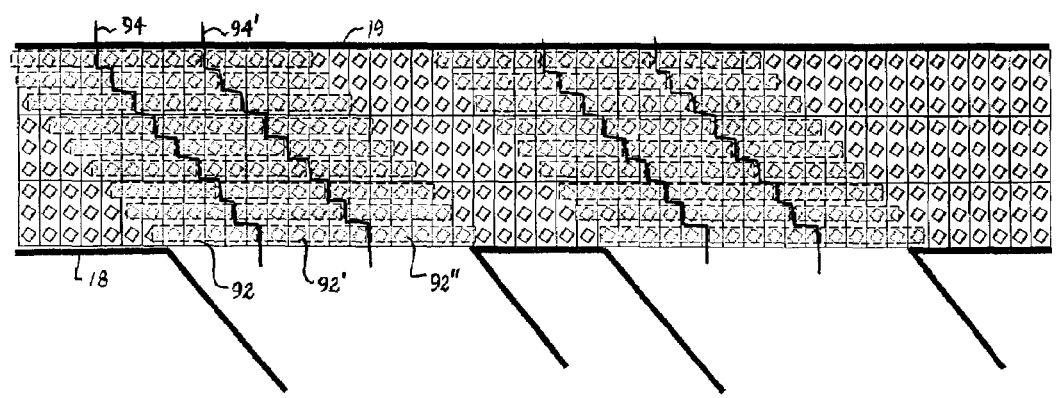
FIG. 11 is a top plan diagram of yet another version of a conveyor embodying features of the invention including staggered roller-control zones.

In the versions described thus far, the bearing surface elements defining consecutive roller-control zones were separated by demarcation lines straight across the width of the conveyor belt. In the conveyor shown in FIG. 10, consecutive bearing surface elements 88, 88', each composed of an array of longitudinal rollers, are arranged in a laterally overlapping bricklay pattern to eliminate the linear dead band extending laterally across the conveyor between consecutive zones. This version has a square-wave demarcation line 90 between consecutive roller-control zones. Another version is shown in FIG. 1, in which consecutive arrays 92, 92', 92" are staggered along stepped diagonal demarcation lines 94, 94'. The upstream ends of the bearing surfaces along the second side edge 19 are positioned upstream of the upstream ends of the bearing surfaces along the first side edge 18 for diverting articles toward the first side edge. This staggered arrangement provides articles closer to the second side edge an extended diagonal path through activated zones sufficient to translate the articles across the entire width of the conveyor belt.

Figure 12:
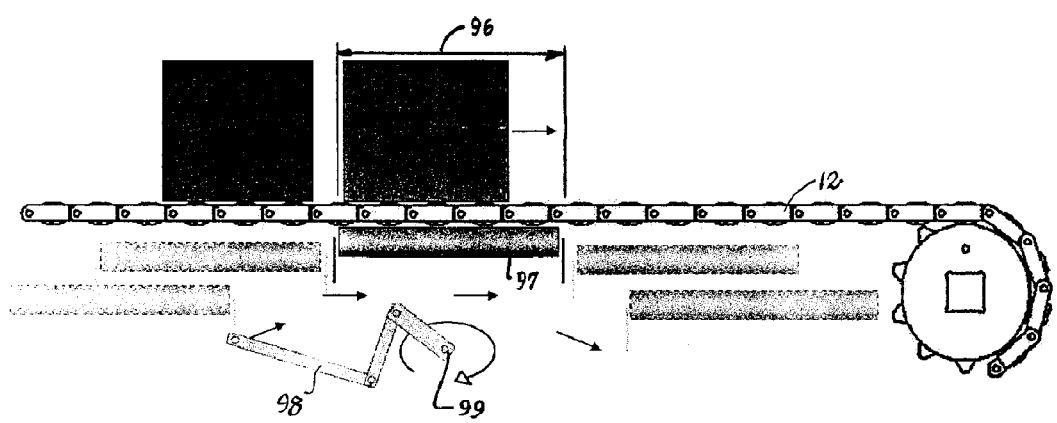
FIG. 12 is a side elevation diagram of still another version of a conveyor embodying features of the invention including roller-control zones that advance with the conveyor belt.

FIG. 12 shows a conveyor in which a roller-control zone 96 moves with the conveyor belt 12. In this example, the bearing surfaces of an array of longitudinal rollers 97 define each moving roller-control zone. A series of end-to-end arrays establish contiguous moving roller-control zones that can be selectively activated or deactivated into or out of contact with the belt rollers. Alternatively, a single, rapidly moving array can be used in applications where articles do not require extremely close spacing. A multi-bar linkage 98 connected to each roller array and rotated about a pivot axis 99 advances the array at the speed of the belt or at the speed of article in the direction of belt travel and returns the array along a return path to position it for another article. By moving with a conveyed article, the roller-control zone can be shorter and articles can be spaced even closer than the length of the rollers on the belt.

Thus, the conveyor belt with oblique rollers sequentially activated in end-to-end-cascaded roller-control zones at the mouth of each side takeaway conveyor is ideal for high-throughput sortation of closely spaced articles and for any other application requiring closely spaced articles to be shifted laterally as the belt advances.

Although the invention has been described in detail with reference to a few preferred versions, other versions are possible. For example, the actuators need not be pneumatically-operated bladders, but could be hydraulically or electrically operated mechanisms. As another example, fewer sensors than shown in FIG. 5B could be used. By fixing the activation time of each roller-control zone based on empirical data, belt speed, and belt width or by using shaft encoders or other belt speed sensing techniques, only a single sensor sensing entry of an article into the most upstream roller-control zone of a series of end-to-end zones is necessary. As yet another example, sequential activation and deactivation in synchronism with the advance of a conveyed article to be diverted can be effected other than by raising and lowering an array of bearing surface elements, which could alternatively be tilted or translated laterally into and out of contact with the belt rollers. Although the preferred belt is a modular plastic conveyor belt, other non-plastic modular belts or even flat belts with oblique rollers may be used. And the rollers may not require rubber sleeves, especially if the roller angle is not so great. Furthermore, the conveyor could be constructed of two oblique-roller belts side by side in which each has rollers arranged to direct conveyed articles toward opposite lateral sides of the conveyor. Alternatively, a single belt with alternating longitudinal lanes of belt rollers oriented in different directions and associated bearing surfaces could be used to sort articles off opposite sides of the belt. Actuators could switch the bearing surface elements between the alternating lanes to divert articles selectively off either side of the belt. So, as these few examples suggest, the scope of the claims is not meant to be limited to the preferred versions described in detail.

What is claimed is:

1. A conveyor comprising:
a conveyor carryway extending from an upstream end to a downstream end;
a conveyor belt supported in the carryway and advancing in a direction of belt travel from the upstream end to the downstream end of the conveyor carryway;
wherein the conveyor belt extends laterally from a first side edge to a second side edge and in thickness from an outer side to an inner side;
wherein the conveyor belt further includes a plurality of belt rollers having salient portions extending past the outer and inner sides of the conveyor belt;
wherein the belt rollers are arranged to rotate on axes oblique to the direction of belt travel;
a series of bearing surface element groups arranged end to end in the direction of belt travel along the carryway, each of the groups individually movable, independently of the other groups, into and out of contact with the salient portions of the belt rollers extending past the inner side of the conveyor belt,
each group corresponding to an alternate travel path oblique to the direction of belt travel, wherein the groups enable selective diverting of articles while allowing a reduced spacing between articles in the direction of belt travel.

2. A conveyor as in claim 1 wherein the bearing surface element groups comprise cylindrical rollers rotatable on axes parallel to the direction of belt travel.

3. A conveyor as in claim 1 wherein each bearing surface element group comprises a group of laterally offset bearing surfaces extending in the direction of belt travel from a first end to a second end.

4. A conveyor as in claim 1 wherein each bearing surface element group comprises a group of staggered bearing surfaces in the direction of belt travel.

5. A conveyor as in claim 1 wherein portions of consecutive bearing surface element groups overlap each other laterally.

6. A conveyor as in claim 1 wherein each bearing surface element group advances in the direction of belt travel.

7. A conveyor as in claim 1 wherein each bearing surface element group extends in the direction of belt travel to a length generally equal to the minimum spacing between consecutive articles conveyed on the upstream end of the carryway.

8. A conveyor as in claim 1 wherein all the belt rollers rotate on parallel or collinear axes.

9. A conveyor as in claim 1 wherein the series of bearing surface element groups arranged end to end in the direction of belt travel along the carryway define contiguous roller-control zones on the conveyor belt and wherein the conveyor further comprises sensors sensing a conveyed article's entry into a roller-control zone.

10. A conveyor as in claim 1 further comprising an actuator coupled to each bearing surface element group to selectively move the bearing surface element group into or out of contact with the salient portions of the belt rollers extending past the inner side of the conveyor belt.

11. A conveyor as in claim 1 further comprising actuators coupled to the series of bearing surface element groups operated to sequentially move the bearing surface element groups into and out of contact with the salient portions of the belt rollers extending past the inner side of the conveyor belt in synchronism with the advance along the conveyor carryway of a conveyed article to be diverted.

12. A conveyor system comprising:
a conveyor extending from an upstream end to a downstream end and laterally from a first side to a second side;
a conveyor belt supported in the conveyor and advancing in a direction of belt travel from the upstream end to the downstream end of the conveyor and including a plurality of belt rollers arranged to rotate on axes oblique to the direction of belt travel and extending through the conveyor belt from a conveying side atop which articles are conveyed and an opposite side;
a series of contiguous roller-control zones formed end to end along the conveyor in the direction of belt travel, each roller-control zone including:
at least one bearing surface disposed at the opposite side of the conveyor belt;
an actuator coupled to the at least one bearing surface for moving the bearing surface into a first position in contact with the belt rollers in the roller-control zone to activate the roller-control zone to divert articles toward the first side of the conveyor by causing the belt rollers to rotate as the belt advances and a second position out of contact with the belt rollers in the roller-control zone to deactivate the roller-control zone to allow articles to continue to be conveyed in the direction of belt travel;
each roller-control zone corresponding to an alternate travel path oblique to the direction of belt travel, wherein the roller-control zones enable selective diverting of articles while allowing a reduced spacing between articles in the direction of belt travel.

13. A conveyor system as in claim 12 further comprising sensors for sensing articles being conveyed through the roller-control zones.

14. A conveyor system as in claim 12 wherein the at least one bearing surface comprises a plurality of cylindrical rollers rotatable on axes parallel to the direction of belt travel.

15. A conveyor system as in claim 12 wherein each roller-control zone extends in the direction of belt travel to a length generally equal to the minimum spacing between consecutive articles conveyed on the conveyor.

16. A conveyor system as in claim 12 wherein all the belt rollers rotate on parallel or collinear axes.

17. A conveyor system as in claim 12 wherein each roller-control zone has diagonal upstream and downstream ends.

18. A conveyor system as in claim 12 wherein consecutive roller-control zones overlap laterally.

19. A conveyor system as in claim 12 wherein the roller-control zones advance in the direction of belt travel.

20. A conveyor system as in claim 12 further comprising a diverted article receiving path disposed at the first side of the conveyor to receive articles diverted off the conveyor by selective activation of the roller-control zones.

21. For use with a conveyor comprising a conveyor belt advancing in a direction of belt travel and having a plurality of belt rollers that are arranged to rotate on axes oblique to the direction of belt travel and that extend past a conveying surface of the belt to support conveyed articles and past an opposite surface of the belt into rolling contact with bearing surfaces, a method for selectively diverting closely spaced articles conveyed on the belt comprising:

arranging the bearing surfaces into individual groups disposed end to end in the direction of belt travel to define associated roller-control zones contiguously disposed along the conveyor;

selectively activating each roller-control zone individually by moving the associated group of bearing surfaces into contact with belt rollers in the conveyor belt and selectively deactivating each roller-control zone by moving the associated group of bearing surfaces out of contact with belt rollers in the conveyor belt, each group corresponding to an alternate travel path oblique to the direction of belt travel, wherein the groups enable selective diverting of articles while allowing a reduced spacing between articles in the direction of belt travel.

22. The method of claim 21 further comprising:
sensing a conveyed article entering or exiting a roller-control zone.

23. The method of claim 21 further comprising:
sequentially activating contiguous roller-control zones to direct a conveyed article laterally across the conveyor belt.

24. The method of claim 21 further comprising:
separating consecutive articles conveyed on the conveyor belt by a gap at least as great as the extent of each roller-control zone in the direction of belt travel.

25. For use with a conveyor comprising a conveyor belt advancing in a direction of belt travel and having a plurality of belt rollers that are arranged to rotate on axes oblique to the direction of belt travel and that extend past a conveying surface of the belt to support conveyed articles and past an opposite surface of the belt into contact with bearing surfaces, a method for diverting articles conveyed on the belt comprising:

forming a series of contiguous roller-control zones along the conveyor in the direction of belt travel, each roller-control zone having at least one bearing surface selectively movable between a first position in contact with the belt rollers in the roller-control zone to activate the roller-control zone and a second position out of contact with the belt rollers in the roller-control zone to deactivate the roller-control zone, each roller-control zone corresponding to an alternate travel path oblique to the direction of belt travel, wherein the roller-control zones enable selective diverting of articles while allowing a reduced spacing between articles in the direction of belt travel;

activating a first roller-control zone as a conveyed article enters the first roller-control zone;

activating a contiguous second roller-control zone as the conveyed article enters the second roller-control zone from the first roller-control zone;

deactivating the first roller-control zone after the conveyed article exits the first roller-control zone.

26. The method of claim 25 further comprising:
activating a third roller-control zone contiguous with the second roller-control zone as the conveyed article enters the third roller-control zone from the second roller-control zone.

* * * * *